(12) United States Patent
Ikeya

(10) Patent No.: US 7,994,681 B2
(45) Date of Patent: Aug. 9, 2011

(54) MOTOR HAVING END-TURN EXTENSION PLATES

(75) Inventor: Masaki Ikeya, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 283 days.

(21) Appl. No.: 12/345,869

(22) Filed: Dec. 30, 2008

(65) Prior Publication Data

US 2009/0195114 A1  Aug. 6, 2009

(30) Foreign Application Priority Data

Jan. 15, 2008  (JP) ................. 2008-005486

(51) Int. Cl.
*H02K 1/08* (2006.01)

(52) U.S. Cl. .......... 310/216.114; 310/216.091; 310/260; 310/270

(58) Field of Classification Search ........... 310/216.091, 310/216.095, 216.113, 216.114, 260, 270, 310/52, 154.42, 154.48, 156.02, 156.06, 310/156.15, 156.34, 156.54, 156.55, 156.57, 310/156.83

See application file for complete search history.

(56) References Cited

U.S. PATENT DOCUMENTS

| 4,683,388 A | * | 7/1987 | De Cesare | 310/46 |
| 5,525,849 A | * | 6/1996 | Ito et al. | 310/90.5 |
| 6,462,458 B1 | * | 10/2002 | Tong et al. | 310/270 |
| 7,275,300 B2 | * | 10/2007 | Clough et al. | 29/596 |

FOREIGN PATENT DOCUMENTS

| JP | 6356138 | 3/1988 |
| JP | 02087950 | 3/1990 |

* cited by examiner

*Primary Examiner* — Quyen Leung
*Assistant Examiner* — Naishadh N Desai
(74) *Attorney, Agent, or Firm* — Dennison, Schultz & MacDonald

(57) ABSTRACT

A motor having a rotor and a stator that houses the rotor in a rotatable manner is herein provided. One of the rotor and the stator comprises at least one permanent magnet. The other of the rotor and the stator comprises at least one core that faces the at least one permanent magnet, and at least one coil that magnetizes the at least one core. The core comprises at least one extension plate that is formed on at least one end face of the core in an axial direction. The extension plate extends parallel to rotation axis of the rotor, and has a magnetic anisotropy whose axis of easy magnetization is substantially parallel to the rotation axis of the rotor.

14 Claims, 7 Drawing Sheets

MOTOR HAVING END-TURN EXTENSION PLATES

CROSS-REFERENCE TO RELATED APPLICATION

This application claims priority to Japanese Patent Application No. 2008-005486, filed on Jan. 15, 2008, the contents of which are hereby incorporated by reference into the present application.

BACKGROUND OF THE INVENTION

1. Field of the Invention

The present invention relates to a motor.

2. Description of the Related Art

Examples of motors are disclosed in Japanese Patent Application Publication No. H02-87950 and Japanese Patent Application Publication No. S63-56138. Each of these motors comprises a stator, and a rotor supported as being rotatable with respect to the stator. The stator comprises permanent magnets, and the rotor comprises cores that face the permanent magnets and coils that excite the cores. Furthermore, on axial end faces of the cores, extension plates that extend along the rotation axes of the cores while facing the permanent magnet are formed.

According to the above-described motor configuration, the facing area between the cores and the permanent magnets is can be increased without elongating surrounding length of the coil; and thereby the motor torque can be advantageously increased.

BRIEF SUMMARY OF THE INVENTION

According to the above-described motor configuration, magnetic flux direction easily changes and thereby eddy current generation easily occurs on the extension plates. Eddy current generation on the extension plates results in energy loss (eddy current loss). For effective increase of motor torque, suppression of eddy current generation on the extension plates is desired.

The teachings disclosed herein solve the above-described problem. It is an object of the present teachings to effectively increase motor torque by suppressing eddy current generation on the extension plate.

A motor according to the present teachings comprises a stator, and a rotor supported in a rotatable manner with respect to the stator. One of the rotor and the stator comprises at least one permanent magnet. The other of the rotor and the stator comprises at least one core that faces the permanent magnet, and at least one coil that excites the core. The core comprises at least one extension plate that is formed on at least one end face of the core. The extension plate extends parallel to a rotation axis of the rotor while facing the permanent magnet, and has a magnetic anisotropy whose axis of easy magnetization is substantially parallel to the rotation axis of the rotor.

According to the above-described motor configuration, magnetic flux flow on the extension plate is stabilized in the axial direction of the rotor, and thereby eddy current generation on the extension plate is suppressed. A disadvantageous energy loss due to eddy current generation is prevented, and thereby motor torque can be effectively increased.

In the above-described motor, the extension plate preferably has at least one nonmagnetic portion that extends substantially parallel to the rotation axis of the rotor.

The extension plate, having at least one nonmagnetic portion that extends substantially parallel to the rotation axis of the rotor, has a magnetic anisotropy whose axis of easy magnetization extends in the axial direction as a whole. This configuration can provide magnetic anisotropy to the extension plate without any special material.

The above-described nonmagnetic portion is preferably a slit (clearance) that is formed on the extension plate.

By employing this configuration, the above-described magnetic anisotropy can easily be endowed to the extension plate. Further, the extension plate is electrically divided along the axial direction into portions that are electrically independent of each other, and thereby eddy current generation on the extension plate is significantly suppressed.

Further, the extension plate is preferably made of a material that has magnetic anisotropy.

A material that has magnetic anisotropy can provide the above-described magnetic anisotropy to the extension plate, without having the above-described nonmagnetic portion. Alternatively, it may also be advantageous that the extension plate made of magnetically anisotropic material further has the above-described nonmagnetic portion (e.g., a slit).

DETAILED DESCRIPTION OF THE INVENTION

Preferred Features of an Embodiment of the Invention

Preferred features of embodiments of the teachings disclosed in the present specification are listed in the following.

(Feature 1) The core is preferably formed of layers of magnetic plates made of a magnetic material. In this case, the extension plate is preferably formed integrally to the core on the magnetic plate arranged on the end-most face in direction parallel to the rotation axis of the rotor.

(Feature 2) For forming the extension plate integrally on the end-most magnetic plate as described above, it is preferable that the end-most magnetic plate and the integral portion which is to be formed into the extension plate are shaped into a flat plate before the portion which is to be the extension plate is bent such that the extension plate extends parallel to the rotation axis of the rotor. In this case, the extension plate is bent along a bending line curving in a circumferential direction with respect to the aforementioned rotation axis. According to an embodiment in which a slit is formed on the extension plate, distortion generation around the bending line is suppressed.

(Feature 3) A configuration according to the present teachings is applicable to both a DC motor and a brushless motor. For application to a DC motor, a stator may include a permanent magnet, and a rotor may include an armature consisting of a core and a coil. For application to a brushless motor, a rotor may include a permanent magnet, and a stator may include an armature consisting of a core and a coil.

Embodiments of the Invention

Figure 1:
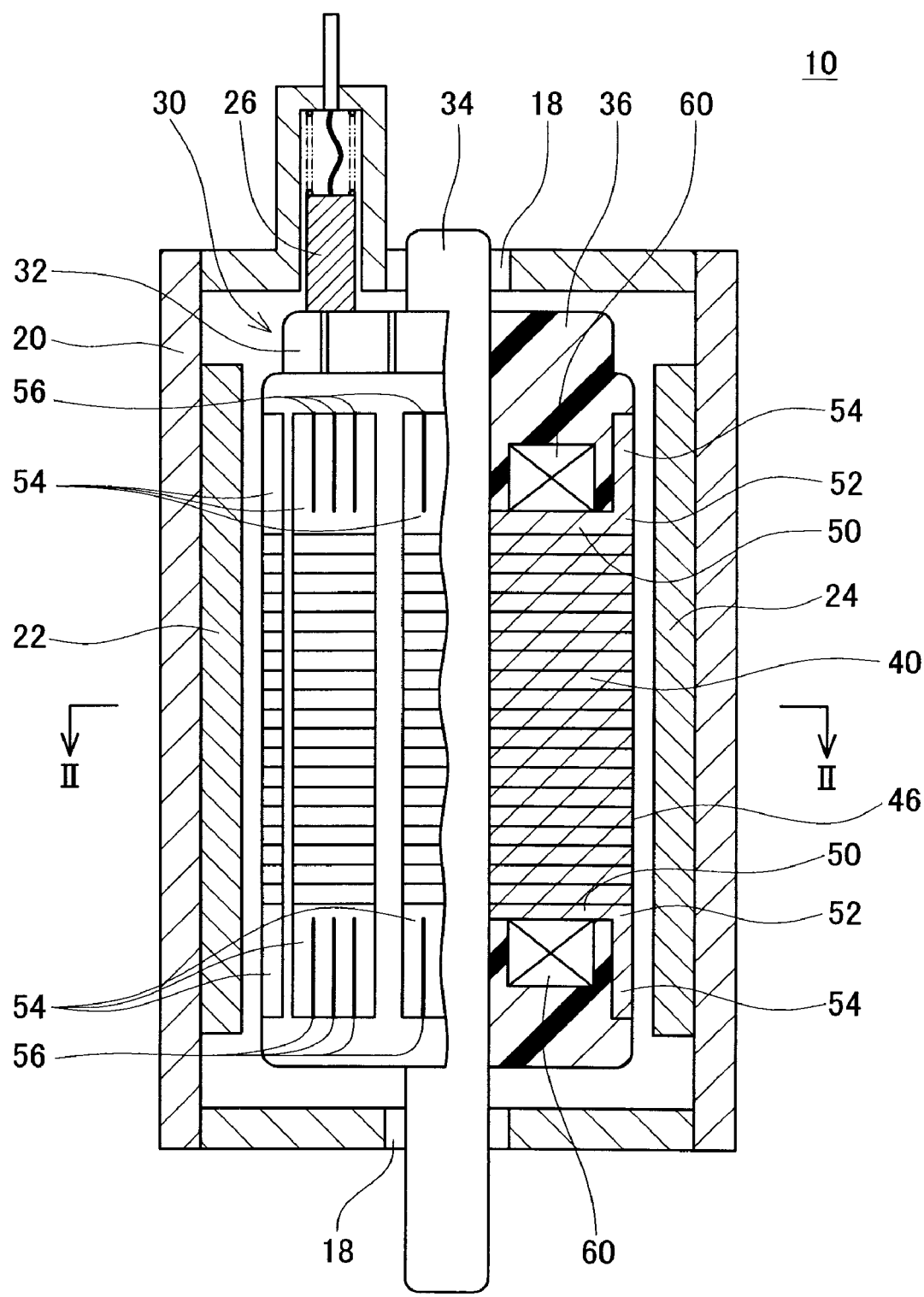
FIG. 1 is a cross-sectional view showing a motor configuration according to an embodiment of the present teachings.
Figure 2:
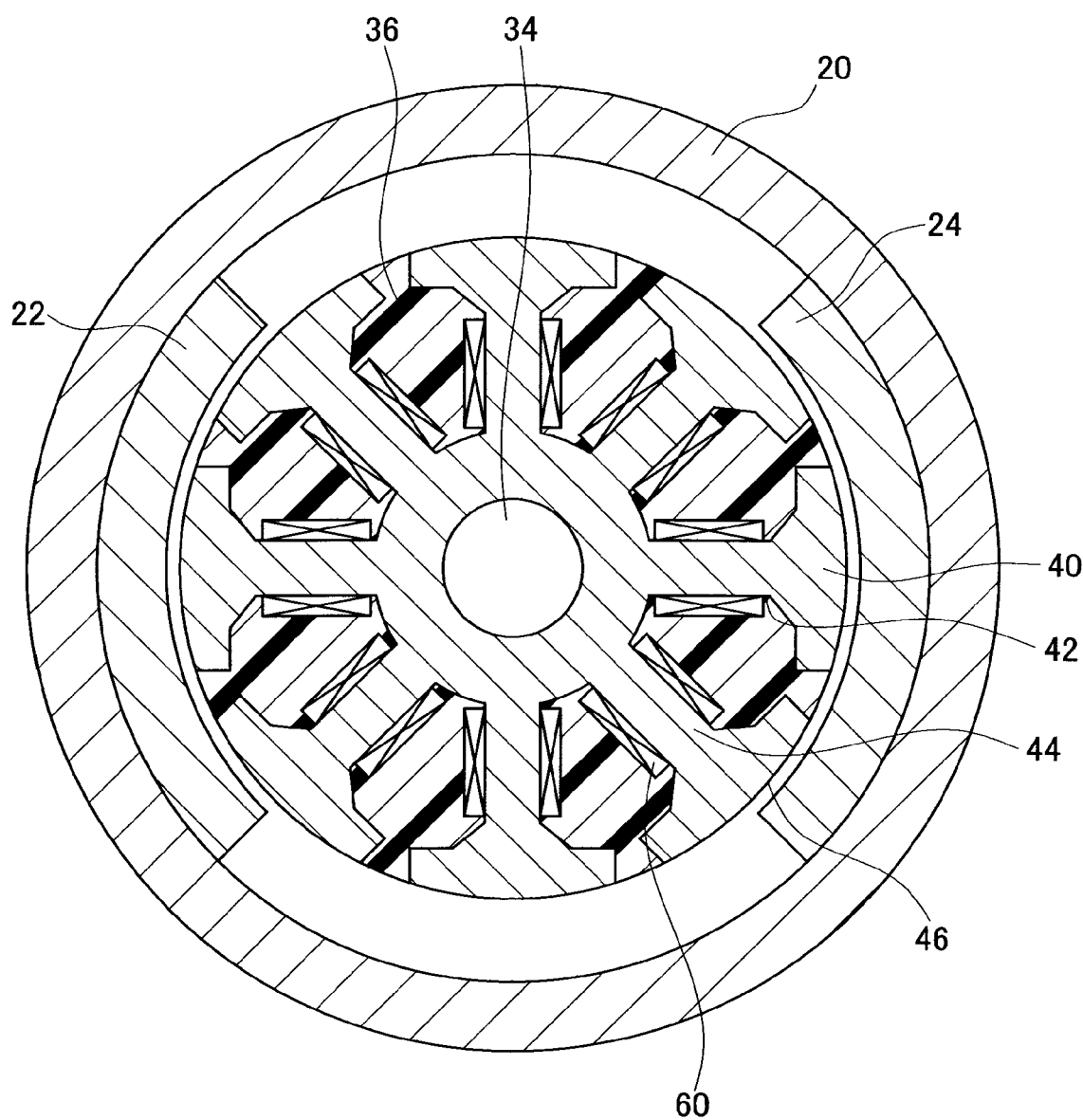
FIG. 2 is a cross-sectional view of the motor along line II-II in FIG. 1.

With reference to the drawings, a motor 10, which is one embodiment of the present teachings, is described. FIG. 1 is a cross-sectional view showing a configuration of the motor 10. FIG. 2 is a cross-sectional view of the motor along line II-II in FIG. 1.

The motor 10 is a DC motor, which is applicable as, but not limited to, a motor for rotating a fuel pump impeller. The motor 10 includes a stator 20 and a rotor 30. The stator 20 has a cylindrical shape, and houses the rotor 30 therein. The rotor 30 is supported by bearings 18, and is able to rotate with respect to the stator 20.

The stator 20 includes two permanent magnets 22 and 24, which face the rotor 30. The two permanent magnets 22 and 24 are fixed opposite to each other while having the rotor 30 arranged therebetween. The permanent magnet 22 is fixed in a manner that its S-pole faces the rotor 30. The other permanent magnet 24 is fixed in a manner that its N-pole faces the rotor 30. The two permanent magnets 22 and 24 are field magnets that generate a static magnetic field in the stator 20. The stator 20 further includes a brush 26. The brush 26 is biased toward the rotor 30 by a resilient force, and makes contact with a commutator 32 of the rotor 30 of which the details will be described later.

The rotor 30 includes a shaft 34, a core 40 fixed to the shaft 34, a plurality of coils 60 that excite the core 40, the commutator 32 that switches the power distribution direction of each of the coils 60, and a resin body 36.

The shaft 34 is supported by the above-described bearings 18, and serves as a rotation axis of the rotor 30. In other words, the central axis of the shaft 34 is equal to the rotation axis of the rotor 30. The shaft 34 serves as an output axis of the motor 10. One end of the shaft 34 (lower end in FIG. 1) protrudes from the stator 20.

In this specification, a direction parallel to the rotation axis of the rotor 30 (the central axis of the shaft 34) may be simply referred to as an "axial" direction, a direction vertical to the rotation axis of the rotor 30 may be simply referred to as a "radial" direction, and a revolving direction rotating around the rotation axis of the rotor 30 may be simply referred to as a "circumferential" direction.

The core 40 is a plurality of layers of magnetic plates made of magnetic material (e.g., magnetic steel), and has a cylindrical columnar shape which is coaxial with the shaft 34. As shown in FIG. 2, a plurality of grooves 42 that extend in the axial direction are formed on the core 40, by which a plurality of salient-poles 44 that extend in the radial direction are defined. As to the core 40 in this embodiment, the eight grooves 42 configure the eight salient-poles 44. On each of the salient-poles 44, coil 60 is wound therearound through the grooves 42, such that the salient-poles 44 are individually magnetized. Furthermore, a circumferential surface 46 is positioned radially outside of each of the salient-poles 44.

The circumferential surfaces 46 face the permanent magnets 22 and 24 of the stator 20 at regular intervals.

As shown in FIG. 1, each axial end of the core 40 includes an end-most magnetic plate 50. The end-most magnetic plates 50 include, on their respective outer circumference edge 52 that faces the stator 20, an extension plate 54 that extends in the axial direction while facing the stator 20. Specifically, the outline shape of the end-most magnetic plate 50 in a planar view coincides with the cross-sectional shape of the core 40 shown in FIG. 2; and each of the eight outer circumference edges 52 of the end-most magnetic plate 50 includes the extension plate 54 (it may also be said that a plurality of extension plates 54, one on each axial ends, is provided for each of the salient-poles 44). Each of the extension plates 54 has an arced surface curving along the circumferential direction, and configures a part of the circumferential surface 46 of the core 40 together with the other magnetic plates. In this configuration, the axial size of the circumferential surface 46 of the core 40 exceeds that of a portion around which the coil 60 of the core 40 is wound. Further, the axial size of the respective permanent magnets 22 and 24 exceeds that of the circumferential surface 46 of the core 40.

Figure 3:
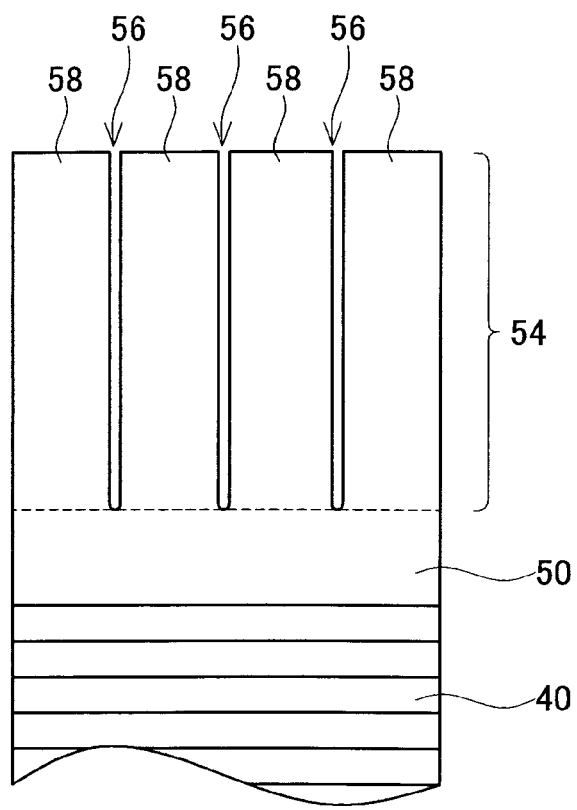
FIG. 3 is an illustration of an extension plate observed from outside in a radial direction.

FIG. 3 is an illustration of the extension plate 54 of the end-most magnetic plate 50 observed from its outside in the radial direction. As shown in FIGS. 1 and 3, at least one slit (clearance) 56 that extends in the axial direction is formed on the extension plate 54, so as to split the extension plate 54 into a plurality of extension pieces 58. In this embodiment, three slits 56 are formed on each of extension plates 54, so as to split each of the extension plates 54 into four extension pieces 58. The slits 56 formed on the extension plate 54, which can be referred to as being a nonmagnetic region, provides to the entire extension plate 54 with a magnetic anisotropy whose axis of easy magnetization extends in the axial direction. This configuration facilitates magnetization of the extension plate 54 in the axial direction, and magnetic flux flow on the extension plate 54 is stabilized in the axial direction. It should be noted that the number of the slits 56 formed on the extension plate 54 is not limited to the aforestated example.

Operation of the motor 10 is described. Basic operation of the motor 10 is similar to that of a conventional DC motor. Specifically, the brush 26 installed on the stator 20 and the commutator 32 installed on the rotor 30 give selective power distribution to the plurality of coils 60 installed on the rotor 30 corresponding to a rotation position of the rotor 30. As a result, the eight salient-poles 44 of the core 40 are selectively exited corresponding to the rotation position of the rotor 30, to repel and attract the permanent magnets 22 and 24 of the stator 20. In accordance with the aforesaid workings of the magnets, the rotor 30 is rotated.

Figure 4:
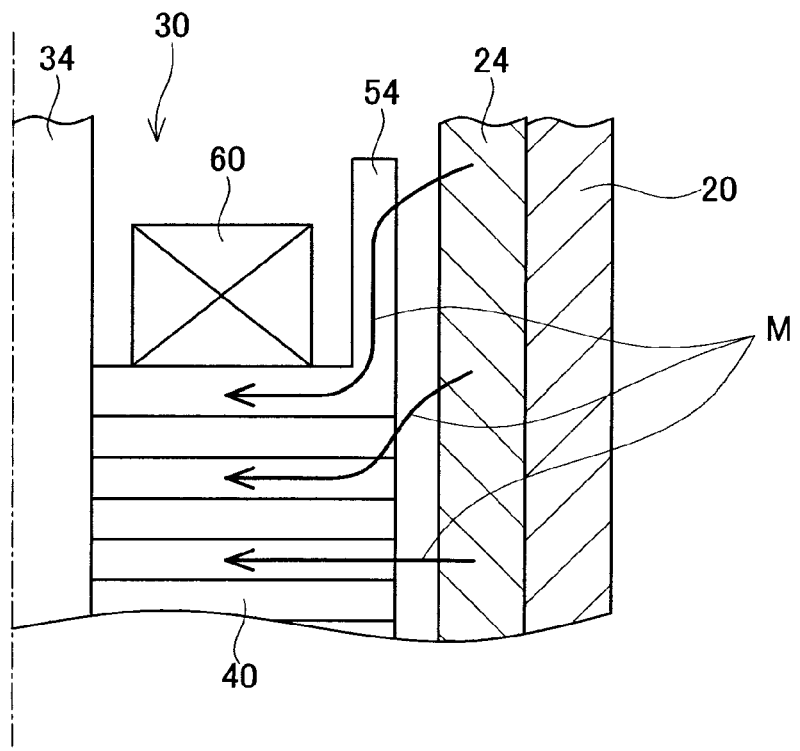
FIG. 4 is a pattern diagram showing magnetic flux flow on the extension plate (observed from a circumferential direction).
Figure 5:
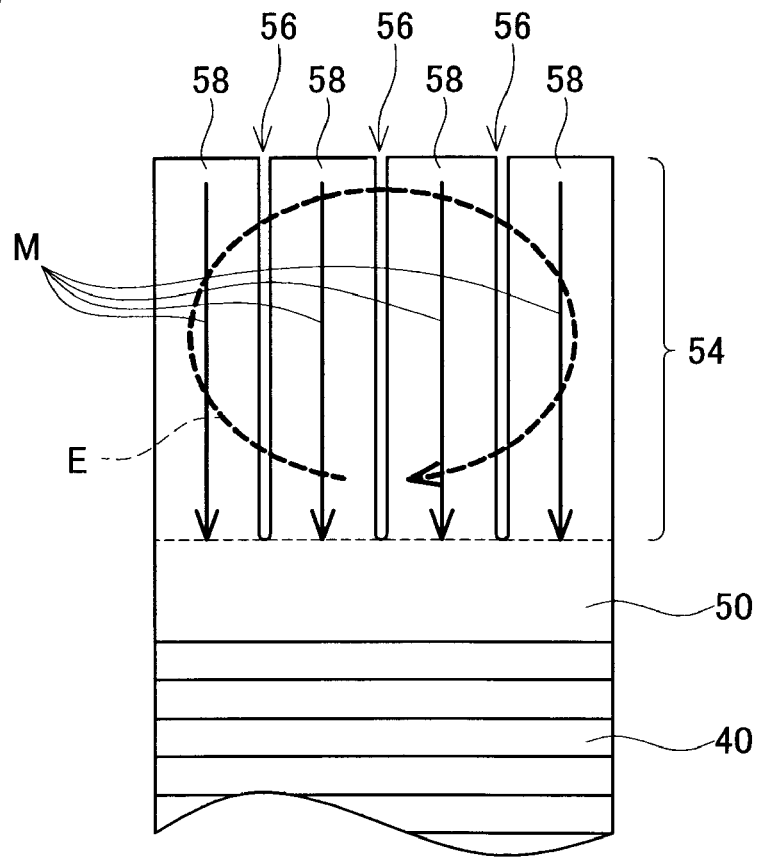
FIG. 5 is a pattern diagram showing magnetic flux flow on the extension plate (observed from the radial direction).

FIGS. 4 and 5 show magnetic flux flow on the extension plate 54 (indicated by solid lines M in the Figs.) during operation of the motor 10. As shown in FIG. 4, the extension plate 54 gathers from a variety of areas the magnetic flux generated by the permanent magnet 24 by using its enlarged circumferential surface 46. Accordingly, the motor 10 can generate a relatively large torque. The extension plate 54, which has the slits 56 formed thereon, in total has a magnetic anisotropy that is subject to magnetizing in along the axial direction. As a result, the magnetic flux on the extension plate 54 flows along the axial direction while a flux flow along the circumferential direction is inhibited. The magnetic flux flow on the extension plate 54 is stabilized while converging to flow along roughly an uniform direction, and thereby eddy current on the extension plate 54 (indicated by the dashed arrow E in FIG. 5) is suppressed. Since eddy current generation on the extension plate 54 is suppressed, a disadvantageous energy loss (so-called iron loss) is prevented. Consequently, the motor torque of the motor 10 is effectively increased.

Figure 6:
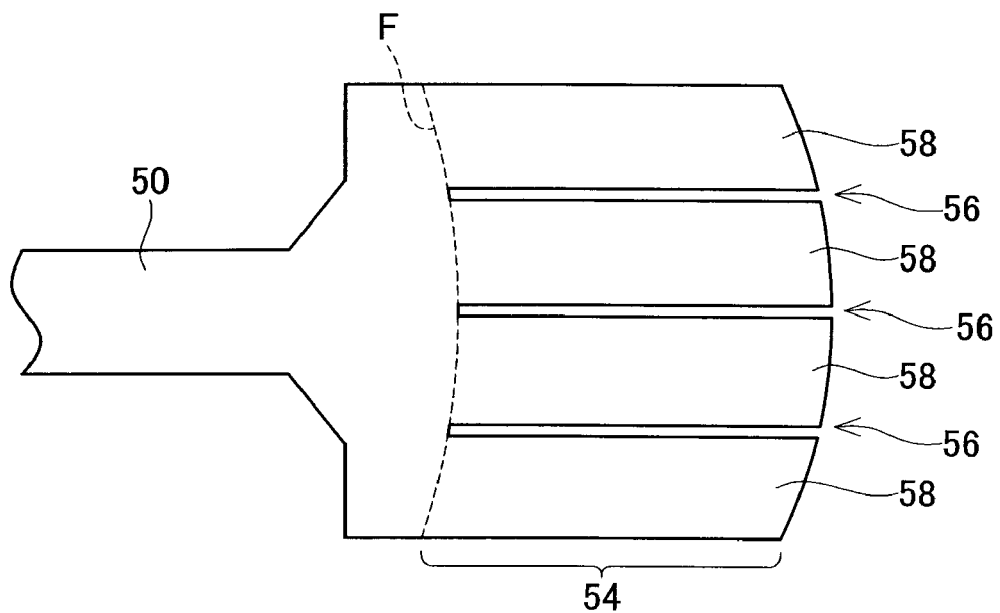
FIG. 6 is an illustration of (a part of) an end-most magnetic plate in a half-finished state.

A production method of the end-most magnetic plate 50 is described below. The end-most magnetic plate 50 can be produced through pressing a plate material, or through pressure-forming a pulverized material (so-called powder compact magnetic core). This embodiment employs the pressing method because of its high production efficiency. As shown in FIG. 6, the end-most magnetic plate 50 is press-cut from a plate material integrally with the portion which is later formed to be the extension plate 54. The slits 56 are also formed through this pressing process. Then, the portion which is yet to configure the extension plate 54 is bent by approximately 90 degrees along a bending line indicated by the dashed line F in FIG. 6 through the further pressing process. The bending line F draws an arc shape curving in the circumferential direction as shown in FIG. 6. Such curvature may cause a difference in distortion degree along the circumferential direction. Accordingly, in a case where the slits 56 are not formed on the extension plate 54, the distortion degree at both ends in the circumferential direction increases; this may result in undesirable transformation of the extension plate 54 such as an elevation or the like. Elevation or warp around the bending line causes a gap between the end-most magnetic plate 50 and the other layered magnetic plates, which may be a factor of torque decrease of the motor 10. Further, a magnetic property of the end-most magnetic plate 50 degrades (i.e. magnetic reluctance thereof increases) at portions with large elevation, which may also be a factor of torque decrease.

However, the extension plate 54 according to this embodiment is split into a plurality of extension pieces 58 by the slits 56. Therefore, a distortion degree and unevenness around the bending line are decreased, and the above-described problems are prevented.

As described above, according to the motor 10 of this embodiment, since the extension plate 54 is formed on the axial end surface of the core 40, a large facing area between the core 40 and the permanent magnets 22, 24 is secured while the surrounding length of the coil 60 is remained relatively small. The slit 56, which is a nonmagnetic portion, extends in the axial direction on the extension plate 54, so as to facilitate magnetic flux flow in the axial direction on the extension plate 54. Therefore, eddy current generation on the extension plate 54 is prevented. These configurations enable significant torque increase of the motor 10 of this embodiment.

Figure 7:
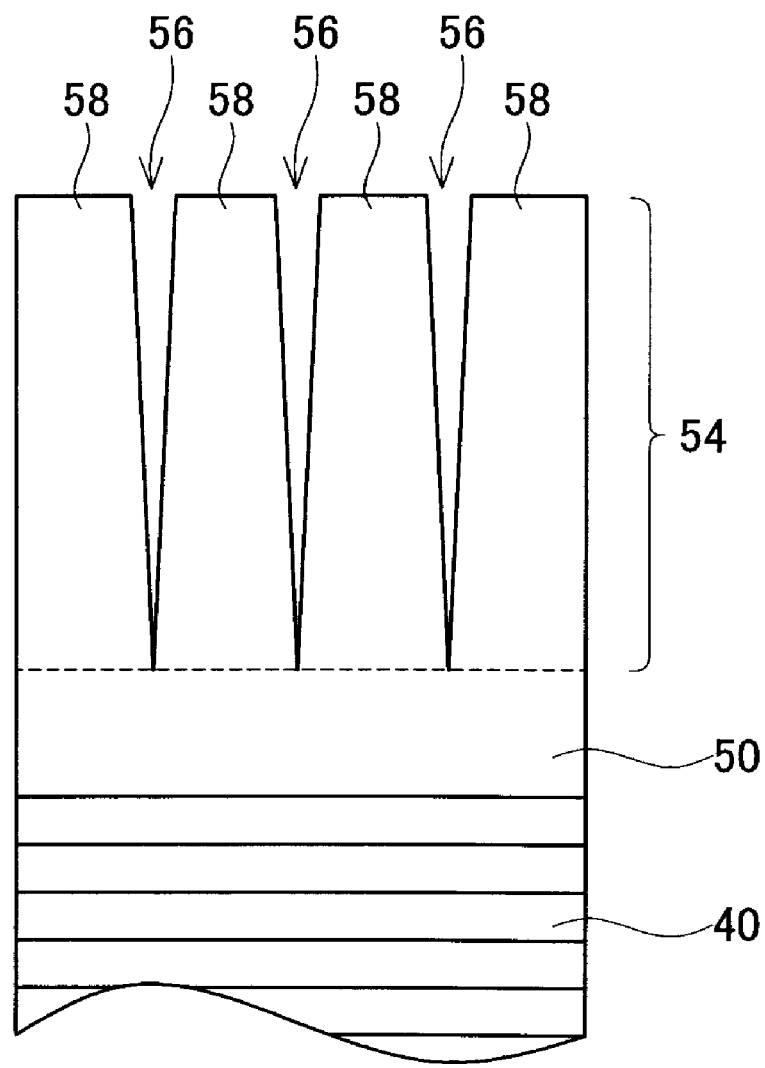
FIG. 7 is an illustration of an alternative slit formed on the extension plate.

In the above-described motor 10, the slit 56 formed on the extension plate 54 can be modified into various shapes. As shown in FIG. 7, the slit 56 can have a tapered, V-shape, for example. Alternatively, the slit 56 can have a wavy shape, as long as the slit 56 as a whole extends in the axial direction.

Figure 8:
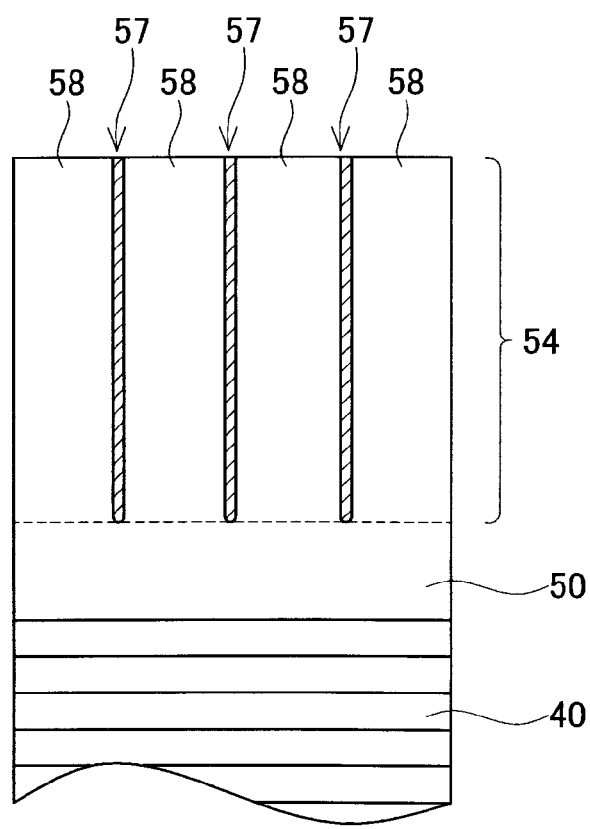
FIG. 8 is an illustration of a nonmagnetic portion formed on the extension plate alternatively to the slit.

In the above-described motor 10, the extension plate 54 does not always require the slits 56. As shown in FIG. 8, at least one region 57, which is made of a nonmagnetic material and extends in the axial direction in the same manner as the slit 56, is also useful. The nonmagnetic material region 57 can be formed by non-magnetizing the corresponding region after the whole of the extension plate 54 is formed uniformly with magnetic material. Exemplary processes for partially non-magnetizing the extension plate 54 include laser irradiation and carburizing. The nonmagnetic material region 57 thus formed is endowed with a magnetic anisotropy property whose axis of easy magnetization extends in the axial direction. Accordingly, eddy current generation on the extension plate 54 is suppressed and thereby any energy loss resulting from such current interference is prevented. Alternatively, a combination of the slit 56 and the processed nonmagnetic material region 57 may be employed to the extension plate 54.

Figure 9:
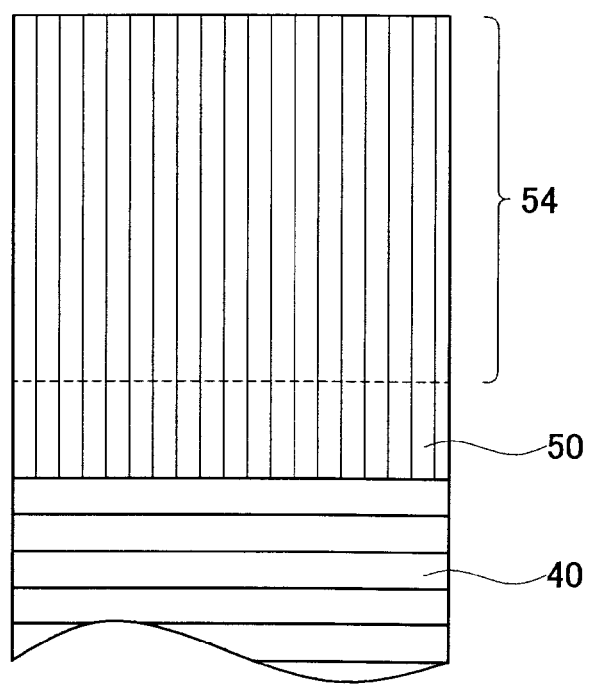
FIG. 9 is a pattern diagram showing an alternative extension plate made of a magnetically anisotropic material.

Further, as shown in FIG. 9, the end-most magnetic plate 50 may be made of a material that has magnetic anisotropy property. Material that has magnetic anisotropy property as its intrinsic attribute endows the extension plate 54 with the magnetic anisotropy property whose axis of easy magnetization extends in the axial direction, without requiring configurations such as the slit 56 or the nonmagnetic material region 57 for the extension plate 54. Accordingly, eddy current generation on the extension plate 54 is suppressed and no energy loss due to such current interference occurs. Alternatively, the slit 56 and/or the nonmagnetic material region 57 may further be formed in addition to the end-most magnetic plate 50 being made of a material that has magnetic anisotropy. The entirety of the end-most magnetic plate 50 does not have to be formed of the magnetically anisotropic material, as long as the extension plate 54 is made of such anisotropic material. In other words, the part that the magnetic anisotropy is required is only the extension plate 54.

Figure 10:
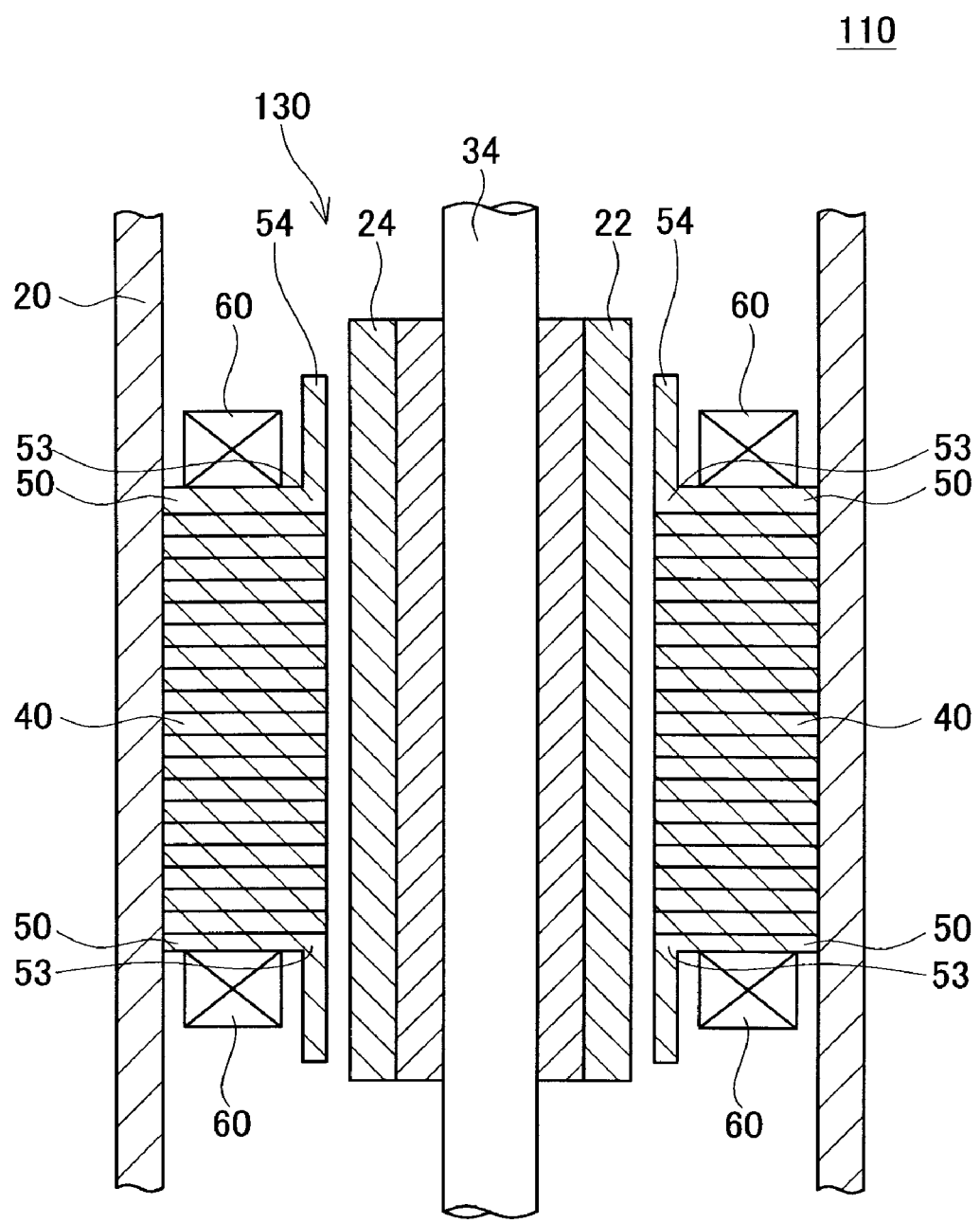
FIG. 10 is a schematic diagram showing a brushless motor configuration.

As shown in FIG. 10, the present teachings further realizes a brushless motor 110. To configure the brushless motor 110, the rotor 30 includes the permanent magnets 22 and 24, and the stator 20 includes an armature consisting of the core 40 and the coil 60. In this case, each of the axial end faces of the core 40 includes, at its inner circumference edge 53 which faces the rotor 30, the extension plate 54 which extends in the axial direction while facing the rotor 30. On the extension plate 54, a nonmagnetic portion which extends in the axial direction (such as the slit 56 or the nonmagnetic material region 57 (cf., FIGS. 3, 7 and 8)) is formed as in the case above of the rotor 10. Alternatively, the end-most magnetic plate 50 may be made of a material that has magnetic anisotropy. In other words, the entirety of the extension plate 54 is configured to have an intrinsic magnetic anisotropy property that enhances the axis of magnetization to extend in the axial direction to have the priority in its occurrence over other directions. As a result, torque of the motor 110 is advantageously increased.

The specific embodiments of the present teachings are described above, but merely illustrate some possibilities of the teachings and do not restrict the scope as claimed. The art set forth in the claims includes variations and modifications of the specific examples set forth above. Some examples of the variations and modifications will be given below.

The above-described extension plate 54 is not always required for both the end faces of the core 40 in the axial direction. Sufficient advantages are expected even in a case where only one axial end face of the core 40 is provided with the extension plate 54.

In the above-described embodiment, the slit 56 and/or the nonmagnetic material region 57 extend in the axial direction of the extension plate 54 substantially along the entire heightwise length of the extension plate 54. However, the slit 56 and/or the nonmagnetic material region 57 may be formed within a limited area along the axial direction of the extension plate 54. Further, the slit 56 is not limited to the shape of a notch extending from an axial end of the extension plate 54, but may be the shape of a pore opening at an axial intermediate of the extension plate 54.

The technical elements disclosed in the specification or the drawings may be utilized separately or in all types of combinations, and are not limited to the combinations set forth in the claims at the time of filing of the application. Furthermore, the art disclosed herein may be utilized to simultaneously achieve a plurality of aims or to achieve one of these aims.

What is claimed is:

1. A motor comprising:
   a rotor; and
   a stator that houses the rotor in a rotatable manner, wherein one of the rotor and the stator comprises at least one permanent magnet,
   the other of the rotor and the stator comprises at least one core that faces the permanent magnet and a plurality of coils that excite the core,
   the core comprises a plurality of poles that are defined by a plurality of grooves arranged in a circumferential direction of the rotor, wherein a corresponding one of the coils is wound on each pole through the grooves,
   each pole of the core comprises at least one extension plate that is formed on at least one end face of the pole, and
   each extension plate extends parallel to a rotation axis of the rotor from the end face of the pole while facing the permanent magnet, and has a magnetic anisotropy whose axis of easy magnetization is substantially parallel to the rotation axis of the rotor.

2. A motor as set forth in claim 1, wherein the extension plate has at least one nonmagnetic portion that extends substantially parallel to the rotation axis of the rotor.

3. A motor as set forth in claim 2, wherein the nonmagnetic portion is a slit that is formed on the extension plate.

4. A motor as set forth in claim 3, wherein the slit linearly extends parallel to the rotation axis of the rotor.

5. A motor as set forth in claim 3, wherein width of the slit is constant in a direction parallel to the rotation axis of the rotor.

6. A motor as set forth in claim 3, wherein the extension plate is made of a material that has magnetic anisotropy.

7. A motor as set forth in claim 2, wherein the nonmagnetic portion is a nonmagnetic material region that is made of a nonmagnetic material.

8. A motor as set forth in claim 7, wherein the nonmagnetic material region linearly extends parallel to the rotation axis of the rotor.

9. A motor as set forth in claim 7, wherein width of the nonmagnetic material region is constant in a direction parallel to the rotation axis of the rotor.

10. A motor as set forth in claim 7, wherein the nonmagnetic material region is a region that is anti-magnetized by irradiation of laser and/or carbonization.

11. A motor as set forth in claim 7, wherein the extension plate, except the at least one nonmagnetic material region, is made of a material that has magnetic anisotropy.

12. A motor as set forth in claim 1, wherein the extension plate is made of a material that has magnetic anisotropy.

13. A motor comprising:
    a rotor; and
    a stator that houses the rotor in a rotatable manner, wherein one of the rotor and the stator comprises a permanent magnet,
    the other of the rotor and the stator comprises a core that faces the permanent magnet and a plurality of coils that excite the core,
    the core comprises a plurality of poles that are defined by a plurality of grooves arranged in a circumferential direction of the rotor, wherein a corresponding one of the coils is wound on each pole through the grooves,
    each pole of the core comprises at least one extension plate that is formed on at least one end face of the pole, and
    each extension plate extends parallel to a rotation axis of the rotor from the end face of the pole while facing the permanent magnet, and has at least one slit that extends substantially parallel to the rotation axis of the rotor.

14. A motor comprising:
    a rotor; and
    a stator that houses the rotor in a rotatable manner, wherein one of the rotor and the stator comprises at least one permanent magnet,
    the other of the rotor and the stator comprises at least one core that faces the permanent magnet and a plurality of coils that excite the core,
    the core comprises a plurality of poles that are defined by a plurality of grooves arranged in a circumferential direction of the rotor, wherein a corresponding one of the coils is wound on each pole through the grooves,
    each pole of the core comprises at least one extension plate that is formed on at least one axial end face of the pole, and
    each extension plate extends parallel to a rotation axis of the rotor from the end face of the pole while facing the permanent magnet, and has at least one nonmagnetic material region that extends substantially parallel to the rotation axis of the rotor.

* * * * *